United States Patent [19]
Geronime

[11] 4,089,036
[45] May 9, 1978

[54] CAPACITIVE LOAD CELL

[75] Inventor: Robert L. Geronime, Rosemount, Minn.

[73] Assignee: Rosemount Inc., Eden Prairie, Minn.

[21] Appl. No.: 740,487

[22] Filed: Nov. 10, 1976

Related U.S. Application Data

[63] Continuation of Ser. No. 457,698, Apr. 4, 1974, abandoned.

[51] Int. Cl.$^2$ .................. H01G 7/00; H01G 5/16
[52] U.S. Cl. ........................... 361/283; 73/718; 361/278; 361/290
[58] Field of Search ................. 73/398 C; 361/283 (U.S. only), 280, 278, 290

[56] References Cited

U.S. PATENT DOCUMENTS 3,859,575  1/1975  Lee ........................... 361/283

Primary Examiner—E. A. Goldberg
Attorney, Agent, or Firm—Dugger, Johnson & Westman

[57] ABSTRACT

A capacitive type load cell utilizing a support, a diaphragm member mounted with respect to said support for movement relative thereto, said diaphragm having a conductive surface, and a capacitor plate attached to the diaphragm so that upon deflection of the diaphragm there will be relative movement between the diaphragm and the capacitor plate. The diaphragm is constructed to provide free edge bending characteristics both at its outer peripheral edges, and between the diaphragm and the load support button, to thereby reduce radial bending stresses in the diaphragm during loading.

11 Claims, 3 Drawing Figures

CAPACITIVE LOAD CELL

This is a continuation of application Ser. No. 457,698, filed Apr. 4, 1974, now abandoned.

BACKGROUND OF THE INVENTION

1. Field of the Invention

The present invention relates to load cells using capacitive type sensing.

2. Prior Art

Various types of load cells have been used in the prior art, which use capacitive sensing. The present device utilizes a capacitor plate mounted directly on the diaphragm that is being deflected, as shown in the copending application of Roger L. Frick, Ser. No. 457,697, filed on even date herewith for "CAPACITIVE PRESSURE SENSOR" and assigned to the same assignee.

One of the causes of inaccuracies in load cells is the high radial bending stresses in the normal diaphragm. The present invention provides for not only a free edge mounting of the deflecting diaphragm adjacent its peripheral edges, but also a relieved area of the diaphragm in its central portions to reduce the radial bending stresses in the center of the diaphragm.

SUMMARY OF THE INVENTION

A capacitive type load cell which has a diaphragm deflectable under load, and a capacitor plate mounted directly to the diaphragm. The diaphragm is mounted onto a support plate or mounting through a thin peripheral ring which provides for "free edge" mounting of the diaphragm to reduce the radial stresses at the outer edge of the diaphragm to nearly zero. This thin ring effectively isolates the main diaphragm stresses from the support because the thin ring will tend to hinge as the diaphragm deflects.

As shown the capacitor plate is attached directly to the diaphragm and as the diaphragm deflects the spacing and therefore the capacitance between the diaphragm and the capacitor plate changes. The change in capacitance provides a signal which is the function of the load on the diaphragm. The central portions of the diaphragm are also relieved in thickness to provide a thin section adjacent the central axis so that a loading button is connected to the diaphragm through a free edge support as well. The thin wall portion between the diaphragm and the load button provides for reduction of radial bending stresses in the center portion of the diaphragm as compared to the stresses in a fixed edge diaphragm construction. The maximum stress of the diaphragm is reduced for a desired deflection and load compared to a diaphragm construction without the centrally located thin wall portion.

Since the radial stresses are very low between the load button and the diaphragm, in the center portions of the diaphragm where the deflection is greatest, the central portion of the diaphragm is the preferred area for mounting the capacitor plate to the diaphragm in order to maximize the active area of the capacitor plate during diaphragm deflection.

Thus the construction herein has the advantages of a large capacitance change for a given amount of diaphragm deflection through the use of a capacitor plate mounted directly to the diaphragm, and includes the free edge supports for the load button and the outer periphery of the diaphragm. Accurate measurement of loads is obtained even if there are variations in the direction of application of the load or if the load is slightly off center.

DESCRIPTION OF THE PREFERRED EMBODIMENTS

Figure 1:
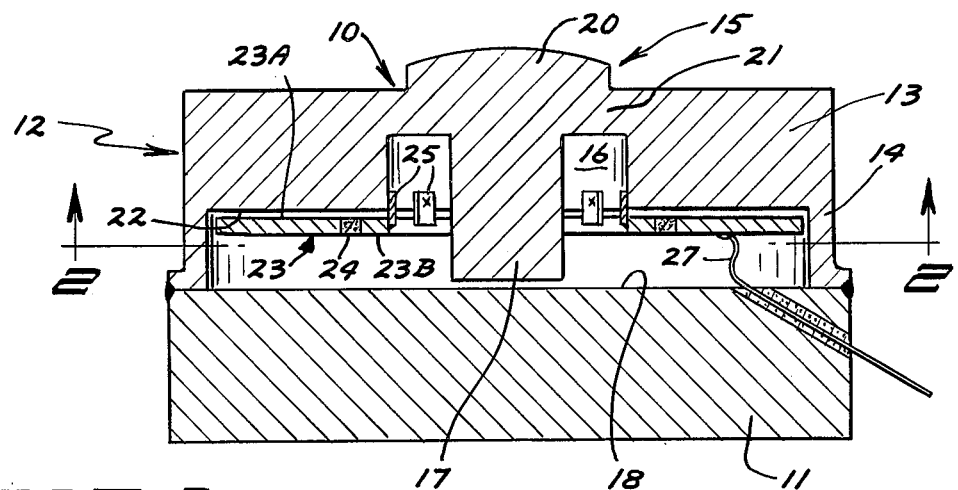
FIG. 1 is a vertical sectional view from a capacitive load cell made according to the present invention.
Figure 2:
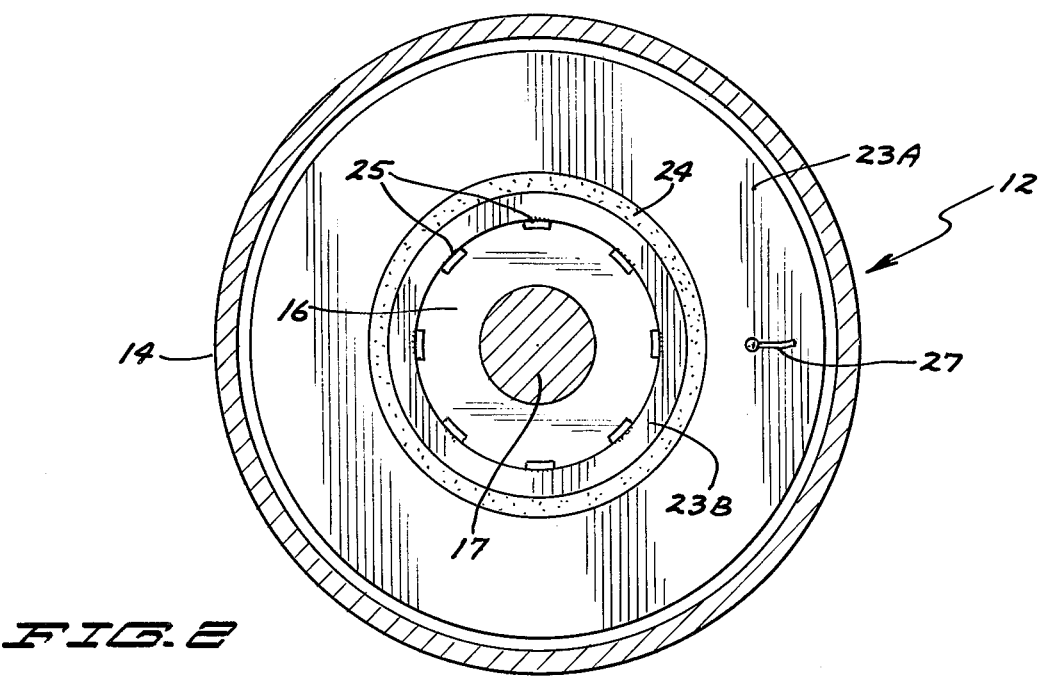
FIG. 2 is a sectional view taken as on line 2—2 in FIG. 1.

A capacitive load cell illustrated generally at 10 comprises a support plate 11 that as shown is circular, and which supports a load cell sensor assembly illustrated at 12. The sensor assembly 12 includes a main diaphragm 13 that also is circular in cross section, and which has an annular thin wall ring 14 connecting the main portion of the diaphragm 13 to the support plate 11 with a suitable weld. The thin ring 14 forms a type of a hinge for supporting the diaphragm 13 when the diaphragm is deflected so that the radial stresses at the edge of the diaphragm are reduced to substantially zero through this mounting ring 14. The mounting ring 14 forms what is called a "free edge" diaphragm support.

The diaphragm 13 also has a central portion illustrated generally at 15 that has a recess 16 defined therein on the interior thereof. The recess 16 as shown is an annular recess that defines a stop member 17 that protrudes toward and faces a surface 18 of the support plate 11. The central portion of the diaphragm also forms a load support button 20 that is used for supporting loads to be measured. The recess 16 forms a thin wall portion 21 which connects the main portion of the diaphragm 13 with the load support button 20 and the stop member 17. The main portion of the diaphragm extends from wall 14 to the recess 16 and surrounds the stop member 17 and recess 16. The thin wall portion 21 provides a hinging action or free edge support for the mounting of the load support button 20.

The diaphragm is made of metal and has a surface 22 that forms a conductive surface. A capacitor plate assembly 23 is mounted to the diaphragm and as shown is formed in the shape of a disc with a center hole therethrough. The disc has an outer peripheral surface that fits within the inner surface of the wall 14, and the inner surface defining the center hole is the same diameter as the wall of the recess 16. The capacitor plate assembly 23 includes an outer sensing portion 23A, and an inner mounting portion 23B which are joined together with a fused insulating ring 24 that for example can be glass or similar material. Suitable straps 25 are used for mounting the plate assembly 23 to the diaphragm 13, and these straps are spot welded to the surface defining recess 16 and to the inner surface of the central opening of the plate assembly 23. The straps may be spot welded after suitable shims have been placed between the surface 22 of the diaphragm 13 and the upper surface of the capacitor plate assembly so that the capacitor plate is independently supported with respect to the central portions of the diaphragm, while the spot welds are made. Then the shims can be removed after welding. When load is applied to the load button 20, the diaphragm 13 will deflect, and the wall 114 will hinge so that there will be substantially no radial bending stresses at the outer edge of the diaphragm. The thin wall portion 21 will act to transfer load to the diaphragm while providing an essentially zero radial stress condition where the capacitor plate assembly 23 is attached to the diaphragm.

A suitable lead wire 27 is attached to the capacitor plate portion 23A, and passes through a provided opening in the support plate 11. The lead wire is insulated from the support plate with suitable material (such as fused glass) where it passes through the support plate.

The capacitor plate assembly 23 that is attached to the diaphragm 13 provides a large change in capacitance with respect to the diaphragm during deflection of the diaphragm 13. The double free edge mounting of the load button or load application member and the peripheral edges of the diaphragm insures that the radial bending stresses are kept to a minimum and that accurate results are obtained. High diaphragm deflections can be achieved without excessive stresses in the diaphragm by the use of this type of mounting.

The diameter of the recess 16 of the diaphragm 13 is considered the inside diameter of the diaphragm, while the diameter of the entire diaphragm is considered the outside diameter. A ratio of the inside diameter of diaphragm 13 to the outside diameter thereof may be in the range of 0.3 to 0.7 but the preferred ratio for lowest maximum stress is about 0.5. With this optimum ratio of about 0.5 the maximum diaphragm stress is much lower, and approaches a level of about only one-half as great as an optimized ratio for a design having a diaphragm with a thick center portion that in effect is coupled to the main portion of the diaphragm through a fixed edge construction. That is, using the thin wall portion for connecting the center portion of the diaphragm to the main portions of the diaphragm and having the proper ratio of the inner diameter to the outer diameter greatly reduces diaphragm stresses.

Figure 3:
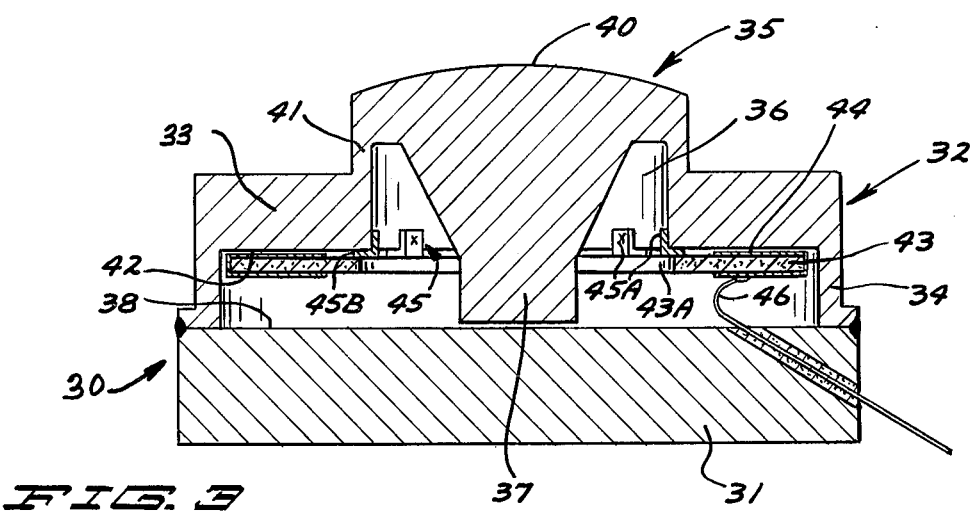
FIG. 3 is a vertical sectional view of a modified form of the load cell of the present invention.

Referring now specifically to the modified form of the invention shown in FIG. 3, a second load cell illustrated generally at 30 has a support plate 31, and the support plate has a sensing section 32 attached thereto on the upper surface thereof. In this form of the invention the sensing portion 32 includes a diaphragm member 33 that is attached to the support plate through a thin peripheral wall 34 that provides a hinging action, or in other words a free edge diaphragm support for the diaphragm 33. The central portion of the diaphragm illustrated generally at 35 is provided with a recess 36. A main portion of the diaphragm 33 extends from the recess 36 to the wall 34 and surrounds the recess. A stop member 37 is defined by this recess 36 in the central portions of the diaphragm. The end of stop member 37 is positioned adjacent an upper surface 38 of the support plate 31, and will stop against this support plate when load applied to the diaphragm deflects the diaphragm a sufficient distance toward the support plate 31.

A load support button 40 is provided in the central portions 35 of the diaphragm 33, and as shown the load button protrudes above the upper surface of the diaphragm and is attached to the diaphragm through an annular thin wall portion 41 defined between the recess 36, and the outer surface of the load button. This thin wall portion 41 acts as a hinge member for supporting the load support button with respect to the diaphragm to reduce any radial bending stresses to a minimum in the central portions of the diaphragm.

An inner surface of the diaphragm illustrated generally at 42 provides a surface that deflects when load is applied to the load support button 40. A capacitor plate 43 is positioned substantially parallel to this surface 42.

The capacitor plate 43 is attached to diaphragm 33 through a plurality of support clips 45.

The capacitor plate 43 is supported at its inner edge 43A by these clips 45, and as shown the clips are L shaped, having an upwardly extending leg 45A and a leg 45B that is positioned between the surface 42 and the upper surface of the plate 43.

In this form of the invention the plate 43 is made of material such as alumina, which is an insulating material, and a thin metal layer 44 is provided on the surfaces of the plate 43. The layer provides a conductive surface to form a capacitor plate with respect to the surface 42. A lead wire 46 can be attached to this layer (the layer extends around the edges of the plate 43). The lead wire passes through an opening in the support plate 31 to suitable sensing equipment. The metal layer 44 does not extend to the inner peripheral surface 43A of the plate 43. The clips 45 are insulated from the metal layer 44. It should be noted that the support for the capacitor plate could be a flanged ring that extends around the peripheral surface 43A and is attached to the inner surface of the recess 36 by suitable spot welding or the like.

The clips 45 are soldered to plate 43 at metalized portions of plate 43 and are of a thickness to provide a desired separation between plate 43 and diaphragm surface 42. The clips 45 are spot welded at portion 45A to diaphragm 33.

In both forms of the invention, the effect of thermal transients acting upon the load cell are minimized because the capacitor plates 23 and 43, respectively, are centrally mounted on the diaphragms. Further, the connecting straps or rings between the plates and the diaphragms are short so that any shifting of the straps themselves is minimized. Temperature transients for an edge mounted diaphragm of more conventional construction can cause relative motions between the diaphragm and the capacitor plate that is being used, and the unit becomes stabilized only after a long period of time. However, with the mounting of the capacitor plates 23 and 43 directly to the respective diaphragms, the temperature transients are minimized because any changes of spacing between the capacitive elements is much reduced when they are mounted directly to the diaphragm.

The mounting straps or mounting rings used for holding the capacitor plates to the diaphragm are made quite flexible, so that the flatness of the capacitor plates themselves is not affected by the stiffness of the straps. The straps are merely used to physically locate the plates a fixed distance from the diaphragm member, and the sensing surface of this member, and the straps are made so that they will not transmit significant bending stresses to the capacitor plates.

Another advantage of this type of construction with the thin wall portion or hinge mounting of the load button together with a centrally mounted capacitor plate which as shown is attached directly to the diaphragm, is that the effects of side load components are small on the total capacitive change for a given load since any unequal bending occurring in the diaphragm is average out by the capacitor plate.

The load cells can easily be modified for tension loading by putting suitable members on the support plates and diaphragm load buttons respectively, and of course an overstop arrangement can be made for tension loading as well. Further, the capacitor plates may be mounted to the diaphragms at their outer peripheral surfaces although the advantages for the mounting at the inner peripheral surfaces have been mentioned.

While direct loads are the primary condition shown being measured in the above description, this type of construction also can be used for measuring pressures applied uniformly across the upper surfaces of the diaphragms if desired.

What is claimed is:

1. A sensor for receiving forces to be measured comprising a support, a force responsive deflectable diaphragm member having a main portion and a central portion, said main portion surrounding said central portion, means mounting the main portion of said diaphragm member to said support at location spaced radially outwardly from the central portion to permit deflection of said diaphragm member under force, said diaphragm member having a recess formed in the central portion, said recess being spaced from the means mounting the main portion of said diaphragm member to said support by said main portion, and said recess forming a wall section at the central portion substantially thinner than the main portion of said diaphragm member, and capacitive sensing means to sense deflection of said diaphragm member from a rest position comprising a capacitor plate member mounted directly to said diaphragm member for translatory movement therewith, said capacitor plate member being mounted to the main portion at a preselected position adjacent the recess and having a surface portion thereof facing a surface portion of the main portion of said diaphragm member, said surface portions changing in spacing with respect to said diaphragm member during deflection of said diaphragm member.

2. The combination specified in claim 1 wherein said recess is surrounded by a peripheral wall, and means physically connected to the peripheral wall and to the capacitor plate to support said capacitor plate with respect to said peripheral wall and thereby to said diaphragm member.

3. The combination specified in claim 2 wherein said means to support said capacitor plate comprises thin strip members without substantial bending strength fixed to the peripheral wall and to the capacitor plate member.

4. The combination specified in claim 1 and a load receiving boss in the center portion of said diaphragm member, said wall section connecting said load receiving boss to the main portion of said diaphragm member.

5. The combination specified in claim 4 wherein said wall section comprises a wall member extending generally perpendicular to said diaphragm member, and wherein said load receiving boss has a load receiving surface offset from the main portion of said diaphragm member.

6. The combination specified in claim 1 wherein said capacitor plate comprises a plate having a central opening therethrough, and an overload stop member attached to said diaphragm member through said well section and positioned to engage said support member when said diaphragm member deflects a predetermined amount, said overload stop member extending through the central opening of said capacitor plate.

7. The combination specified in claim 1 wherein said capacitor plate comprises an insulating member, a plurality of support clips physically attached directly to said diaphragm member, and to said diaphragm for supporting the capacitor plate, and a metal coating on portions of said capacitor plate facing said diaphragm member to form an electrically conductive surface.

8. The combination as specified in claim 1 wherein said means mounting said diaphragm member to said support comprises a thin wall section at the outer periphery of said diaphragm member providing substantially free edge support for said diaphragm member during deflection thereof.

9. A sensor for receiving forces to be measured comprising a support, a force responsive deflectable diaphragm member having a main portion and a central portion, said main portion surrounding said central portion, means mounting the main portion of said diaphragm member to said support at location spaced radially outwardly from the central portion to permit deflection of said diaphragm member under force, said diaphragm member having a recess formed in the central portion and encompassed by an interior annular wall of a diameter comprising an inner diameter of said main portion, said diaphragm member having an outer diameter adjacent said means mounting, the ratio of said inner diameter to said outer diameter being between substantially 0.3 and 0.7, said recess forming a wall section at the central portion substantially thinner than the main portion of said diaphragm member, and capacitive sensing means to sense deflection of said diaphragm member from a rest position comprising a capacitor plate member mounted directly to said diaphragm member for translatory movement therewith, said capacitor plate member being mounted at a preselected position not substantially closer to the central axis than said interior annular wall and having surface portions thereof facing a surface of said diaphragm member, said surface portions changing in spacing with respect to said diaphragm member during deflection of said diaphragm member.

10. The combination of claim 9 wherein said ratio is substantially 0.5.

11. The combination as specified in claim 1 wherein said recess is surrounded by a peripheral wall defining an inner edge of said main portion, and flexible clip means connected to the peripheral wall and depending therefrom, said capacitor plate having a central opening defined by a capacitor plate inner peripheral wall, and means to fix said flexible clip means to said inner peripheral wall of said capacitor plate.

* * * * *